United States Patent
Gerfen et al.

(10) Patent No.: US 11,041,582 B2
(45) Date of Patent: Jun. 22, 2021

(54) ANTI-ROTATIONAL PUSH TO CONNECT FITTING

(71) Applicant: Cerro Flow Products LLC, St. Louis, MO (US)

(72) Inventors: John E. Gerfen, Tinley Park, IL (US); Jon D. Hoegemeier, St. Louis, MO (US)

(73) Assignee: Cerro Flow Products LLC, St. Louis, MO (US)

( * ) Notice: Subject to any disclaimer, the term of this patent is extended or adjusted under 35 U.S.C. 154(b) by 231 days.

(21) Appl. No.: 16/263,198

(22) Filed: Jan. 31, 2019

(65) Prior Publication Data
US 2019/0234545 A1 Aug. 1, 2019

Related U.S. Application Data

(60) Provisional application No. 62/625,116, filed on Feb. 1, 2018.

(51) Int. Cl.
| | |
|---|---|
| *F16L 37/091* | (2006.01) |
| *F16L 21/00* | (2006.01) |
| *F16L 21/04* | (2006.01) |

(52) U.S. Cl.
CPC ........... *F16L 21/007* (2013.01); *F16L 21/045* (2013.01); *F16L 37/091* (2013.01); *F16L 37/0915* (2016.05)

(58) Field of Classification Search
CPC ............................ F16L 37/091; F16L 37/0915
(Continued)

(56) References Cited

U.S. PATENT DOCUMENTS

| | | | | |
|---|---|---|---|---|
| 1,440,207 A | * | 12/1922 | Burns | .................... F16L 19/086 |
| | | | | 285/340 |
| 4,911,406 A | * | 3/1990 | Attwood | ............... F16L 37/091 |
| | | | | 251/148 |

(Continued)

FOREIGN PATENT DOCUMENTS

| | | |
|---|---|---|
| CN | 106764181 A | 5/2017 |
| DE | 102012021683 A1 | 5/2014 |

(Continued)

OTHER PUBLICATIONS

Written Opinion issued by ISA/EPO in connection with PCT/US2019/016347 dated Apr. 8, 2019.

(Continued)

*Primary Examiner* — David Bochna
(74) *Attorney, Agent, or Firm* — Levenfeld Pearlstein, LLC

(57) ABSTRACT

An anti-rotational push to connect fitting includes a housing defining an internal cavity, the internal cavity having, at least in part, a non-circular shape. The housing has a conduit receiving region having an inwardly oriented wall. A seal is positioned in the housing adjacent to the conduit receiving region. A grip ring support is positioned in the housing adjacent to the seal. The grip ring support has a transverse flange having an inner peripheral edge and an outer peripheral edge and a longitudinal wall extending from the flange spaced from the inner and outer peripheral edges to define gaps between the longitudinal wall and a wall of the housing and inwardly of the longitudinal wall. A grip ring is positioned adjacent to the grip ring support and is seated on an end of the wall. The grip ring has a non-circular shape configured to cooperate with the housing internal cavity and the grip ring support. The grip ring has a peripheral portion that seats on the longitudinal wall and a series of circum- (Continued)

ferentially positioned, inwardly projecting flexible, angled fingers.

16 Claims, 4 Drawing Sheets

(58) Field of Classification Search
USPC .......................................................... 285/340
See application file for complete search history.

(56) References Cited

U.S. PATENT DOCUMENTS

| | | | | |
|---|---|---|---|---|
| 6,386,596 B1* | 5/2002 | Olson | ................ | F16L 37/0927 |
| | | | | 285/321 |
| 6,464,266 B1* | 10/2002 | O'Neill | ................ | F16L 37/091 |
| | | | | 285/340 |
| 7,878,555 B2* | 2/2011 | Oh | ................ | F16L 37/091 |
| | | | | 285/340 |
| 9,464,743 B2* | 10/2016 | Schutte | ............... | F16L 37/0915 |
| 9,523,454 B2* | 12/2016 | Schutte | ............... | F16L 37/0915 |
| 10,161,551 B2* | 12/2018 | Hunt | .................. | F16L 37/0915 |
| 2004/0070198 A1 | 4/2004 | Rohrig | | |
| 2009/0278346 A1* | 11/2009 | O'Brien | ................ | F16L 37/091 |
| | | | | 285/23 |
| 2016/0161038 A1* | 6/2016 | Crompton | ............. | F16L 37/091 |
| | | | | 285/340 |

FOREIGN PATENT DOCUMENTS

| | | |
|---|---|---|
| EP | 1209404 A1 | 5/2002 |
| WO | 9302315 A1 | 2/1993 |
| WO | 2015089583 A2 | 6/2015 |

OTHER PUBLICATIONS

International Preliminary Report on Patentability issued by ISA/EPO in connection with PCT/US2019/016347 dated Aug. 4, 2020.
International Search Report and Written Opinion issued by ISA/EPO in connection with PCT/US2019/016347 dated Apr. 8, 2019.

* cited by examiner

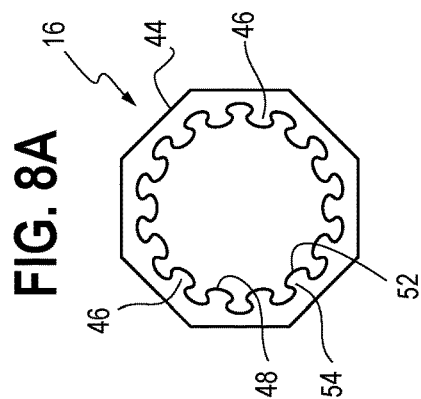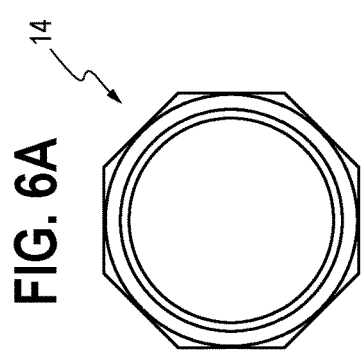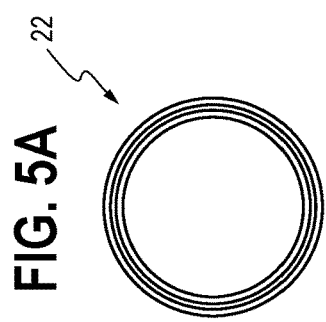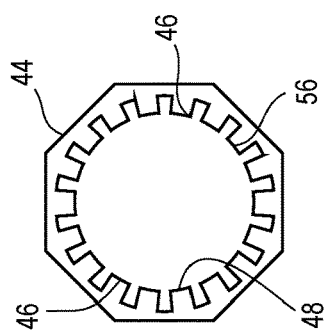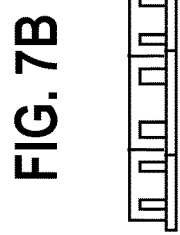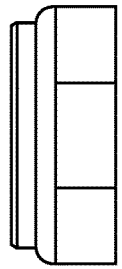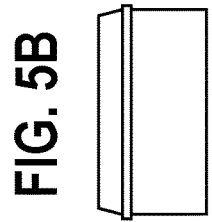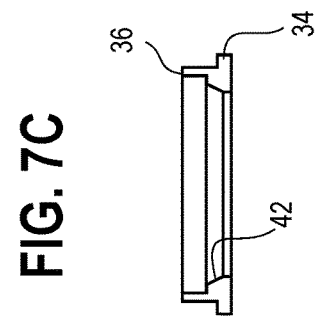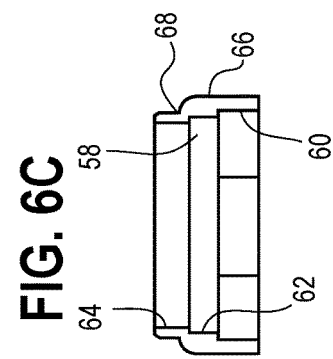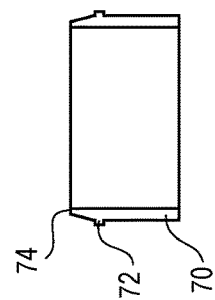

ANTI-ROTATIONAL PUSH TO CONNECT FITTING

CROSS-REFERENCE TO RELATED APPLICATION DATA

This application claims the benefit of and priority to Provisional U.S. Patent Application Ser. No. 62/625,116, filed Feb. 1, 2018, titled "Anti-Rotational Push to Connect Fitting", the disclosure of which is incorporated herein in its entirety.

BACKGROUND

The present disclosure relates generally to push to connect fittings, and in particular, to push to connect fittings that are resistant to rotation when installed.

Push to connect fittings are a type of compression fitting, that are non-soldered and non-solvent cemented fittings, used in fluid systems. The fittings are commonly used in that they are readily attached without tools and can be easily disconnected. The fittings function by using a series of metal spurs or fingers inside the fitting that grips the pipe or tube when the pipe or tube is inserted into the fitting socket. A seal, such as an O-ring provides the liquid-tight or gas-tight seal between the pipe or tube and the fitting to assure that there is no leakage.

Although push to connect fittings provide significant advantages over soldered and solvent cement fittings, one drawback is that the pipe or tube and the fitting can rotate relative to one another. This, of course, is prevented in soldered and solvent cement fittings in the pipe or tube and the fitting are physically joined to one another by some fixed intermediary (e.g., the solder or the solvent cement). As such, in push to connect fittings, even though the joint may be liquid and/or air tight, because the pipe or tube can rotate relative to the fitting, it may not appear to be a "tight" joint.

Accordingly, there is a need for a push to connect fitting that prevents rotation of the fitting relative to the pipe or tube. Desirably, such a fitting is easy to install and remove.

SUMMARY

An anti-rotational push to connect fitting includes a housing defining an internal cavity having, at least in part, a non-circular shape. The housing has a conduit receiving region having an inwardly oriented wall. A seal is positioned in the housing adjacent to the conduit receiving region.

A grip ring is positioned in the housing. The grip ring has a non-circular shape configured to cooperate with and fit into the housing internal cavity.

The grip ring has a peripheral portion and one or more inwardly oriented gripping members. In an embodiment, the gripping members are a series of circumferentially positioned, inwardly projecting flexible, angled fingers. In an embodiment, the grip ring support has a non-circular shape configured to cooperate with and fit into the housing internal cavity.

In an embodiment, a grip ring support is positioned in the housing adjacent to the seal. The grip ring support has a transverse flange having inner and outer peripheral edges and a longitudinal wall extending from the transverse flange spaced from the edges. The wall defines a first gap between the wall and a wall of the housing and second gap inwardly of the longitudinal wall. The grip ring can be positioned adjacent to the grip ring support and seated on an end of the longitudinal wall.

The fitting can further include a fitting body that is configured to cooperate with and fit, at least in part, in the housing internal cavity. In an embodiment, the fitting body defines an internal cavity having a non-circular shape configured to cooperate with the grip ring and the grip ring support. The fitting body internal cavity configured to receive the grip ring peripheral portion to secure the grip ring peripheral portion. In an embodiment, the fitting body has a non-circular shape configured to cooperate with and fit, at least in part, in the housing internal cavity.

In an embodiment, the fitting further includes an unlock ring positioned, in part, in the fitting body. The unlock ring has a body, a flange, and a tapered end tapering forwardly and inwardly from the flange. The unlock ring is configured to reciprocate within the fitting body between a grip ring locked position and a grip ring unlocked position. In an embodiment, when in the grip ring is in the unlocked position, the tapered end contacts and urges the grip ring flexible fingers outwardly so that the conduit can be removed from the fitting. In other embodiments the fitting does not include the unlock ring and the conduit, once inserted or installed in the fitting, is not removable.

The fitting body can be positioned to overlie the grip ring support longitudinal wall and to capture the grip ring peripheral portion between the fitting body and the grip ring support longitudinal wall.

In an embodiment, the grip ring support has a non-circular shape configured to cooperate with and fit into the housing internal cavity. The non-circular shape of the housing internal cavity, the grip ring, the grip ring support and the fitting body can be, for example, a polygonal shape. The polygonal shape can be, for example, a hexagonal shape.

In an embodiment, the housing internal cavity includes a first stepped region and a second stepped region. The seal can be positioned in the first stepped region and the grip ring support can be positioned in the second stepped region.

In an embodiment, the housing defines a longitudinal axis, and the housing, the grip ring support, the grip ring, the fitting body and the unlock ring are all coaxial.

In an embodiment, the grip ring is molded into the housing. The fitting body can be over-molded over the grip ring in the housing. The fitting body can be over-molded over the grip ring and grip ring support.

In embodiments, the grip ring is formed from metal. One suitable metal is stainless steel.

These and other features and advantages of the present disclosure will be apparent from the following detailed description, in conjunction with the appended claims.

BRIEF DESCRIPTION OF THE DRAWINGS

FIGS. 5A-5C are various views of the fitting unlock ring, in which FIG. 5A is a top view of the ring, FIG. 5B is a side view of the ring, and 5C is a sectional view of the ring;

FIGS. 6A-6C are various views of the fitting body in which FIG. 6A is a top view of the body, FIG. 6B is a side view of the body, and 6C is a sectional view of the body;

FIGS. 7A-7C are various views of the grip ring support in which FIG. 7A is a top view of the support, FIG. 7B is a side view of the support, and 7C is a sectional view of the support;

FIGS. 8A and 8B are examples of grip rings;

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
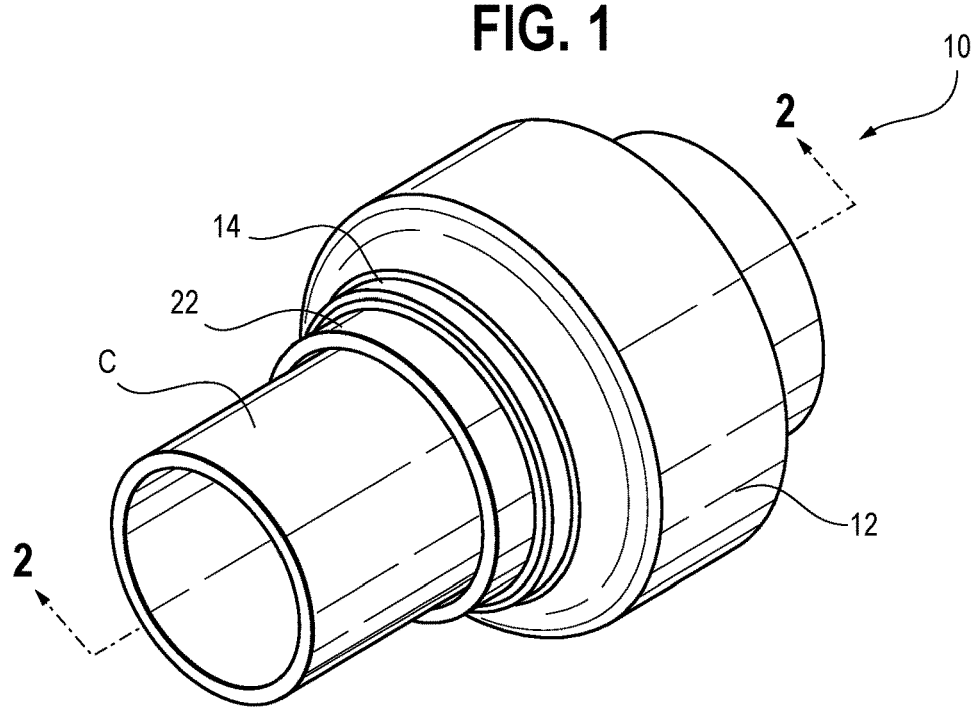
FIG. 1 is a perspective illustration of an embodiment of an anti-rotational push to connect fitting, shown with a section of tubing in the fitting.
Figure 2:
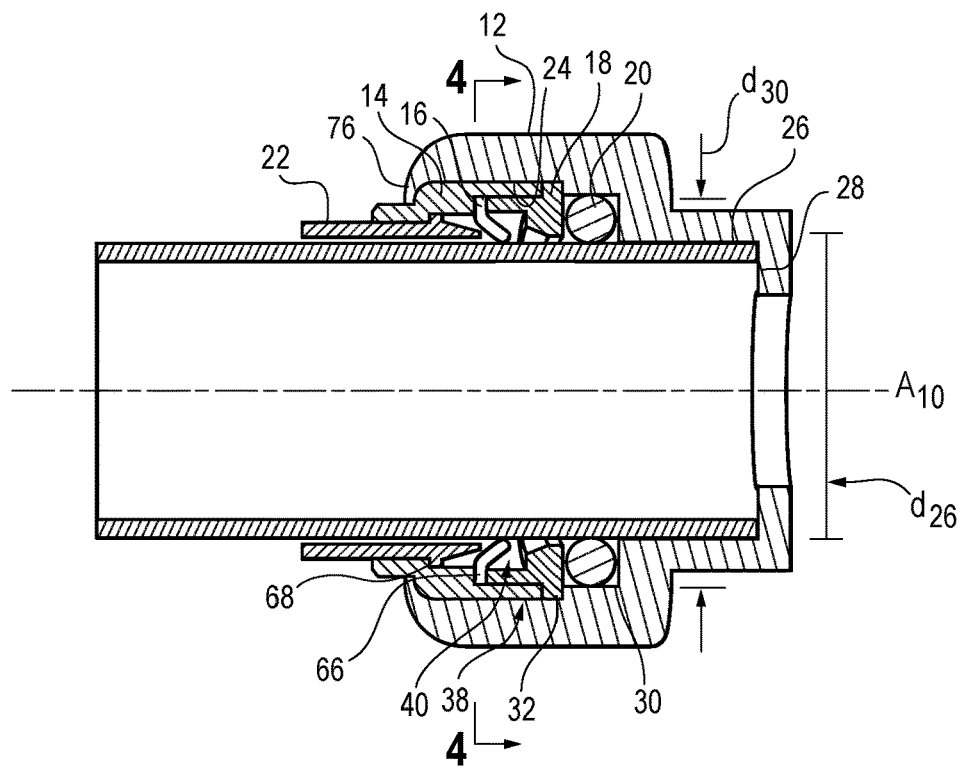
FIG. 2 is cross-sectional view of the fitting of FIG. 1 taken along line 2-2 of FIG. 1.
Figure 3:
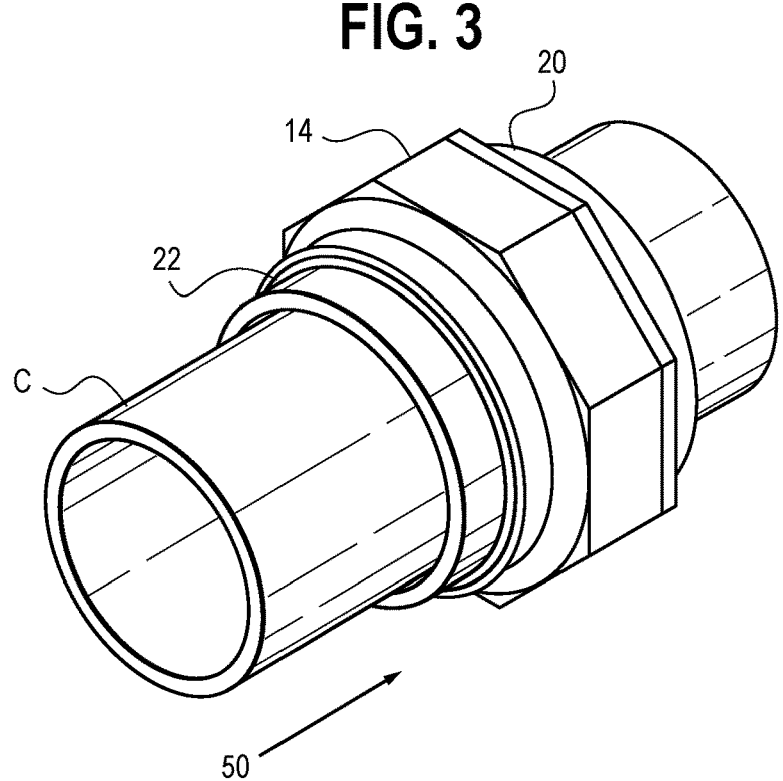
FIG. 3 perspective illustration of the anti-rotational push to connect fitting of FIG. 1 with the fitting housing removed or ease of illustration.

FIG. 1 is a perspective view of an embodiment of an anti-rotational push to connect fitting 10. The fitting 10 is a compression fitting used in fluid systems that does not require solder or solvent cement and provides a liquid-tight or gas-tight seal between the pipe or tube C and the fitting 10. Referring to FIGS. 1 and 2, the fitting 10 defines a longitudinal axis $A_{10}$. In an embodiment, the fitting 10 can include, generally, a housing 12, a fitting body 14, a grip ring 16, a grip ring support 18, a seal 20 and, in some embodiments such as that illustrated in FIGS. 1-4 and 9, an unlock ring 22. The fitting 10 is configured to receive a section (end) of pipe or tube (generally, a fluid conduit C) and secure the pipe or tube C in the fitting 10 such that the pipe or tube C does not rotate relative to the fitting 10.

Figure 9:
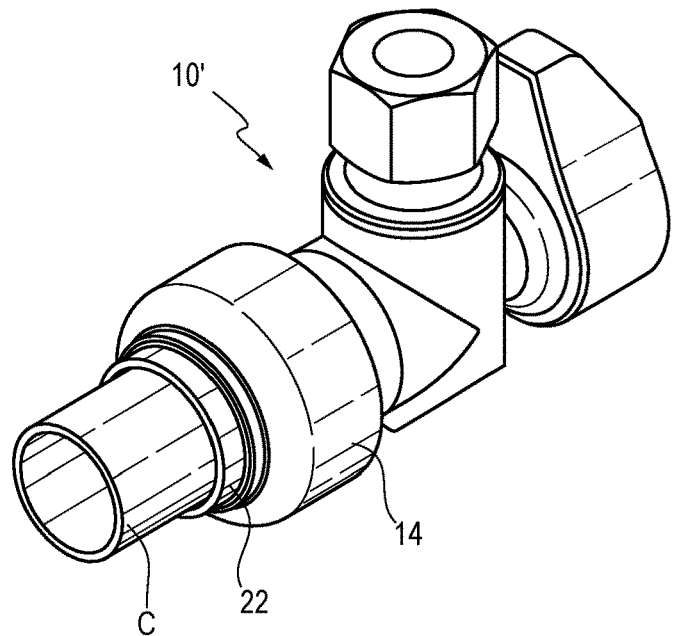
FIG. 9 is a perspective illustration of an anti-rotational push to connect fitting in another type of fitting arrangement.

The housing 12 can be any of a wide variety of components on which the fitting 10 is formed. For example, the housing 12 can be a straight-though component as shown in FIGS. 1 and 2. Alternately, as shown in FIG. 9 and as will be discussed below, the fitting 10' can be formed as part of a T-fitting that allows for a split or joining of two streams of fluid.

For purposes of the present disclosure, the pipe or tube will be referred to as a conduit C, and it is to be understood that all such fluid carrying members are within the scope and spirit of the present disclosure. Also for purposes of the present disclosure, the components described herein as having a non-circular shape are not fully circular and can have a wide variety of shapes, including, for example, a circular shape having one or more sides that are non-circular, such as one or more flat or flattened sides. In such a configuration, cooperating or mating members having non-circular shapes, including circular shapes having one or more flat or flattened sides, when fitted together, are prevented from rotating relative to one another. All such configurations in which the cooperating or mating members are prevented from rotating relative to one another are likewise within the scope and spirit of the present disclosure.

Figure 4:
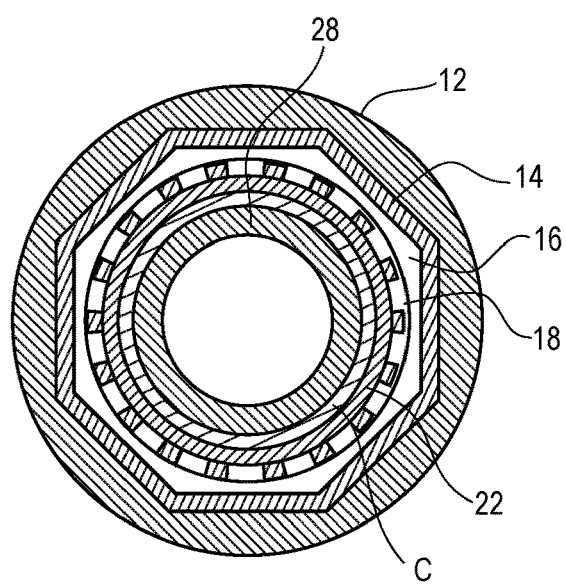
FIG. 4 is cross-sectional view of the fitting of FIG. 1 taken along line 4-4 of FIG. 2.

The housing 12 defines an internal cavity 24 to support the components as described below. In an embodiment, a portion of the internal cavity 24 is non-circular in shape. For example, the walls that define the non-circular shape portion of the internal cavity 24 can have an octagonal shape as illustrated in FIG. 4. Alternately, as discussed above, the walls that define the cavity 24 can have a circular shape with for example one or more flattened regions so that the components having complementary shapes and mated with the housing 12 will not rotate relative to one another and the housing 12.

The housing 12 has a conduit receiving region 26 that is sized to receive the conduit C. The conduit receiving region 26 terminates at an inwardly oriented end wall 28 against which the conduit C end rests. The housing 12 has a first stepped region 30 adjacent to the conduit receiving region 26 that has a diameter $d_{30}$ larger than the diameter $d_{26}$ of the conduit receiving region 26. The seal 20 is positioned at the first stepped region 30. The seal has an inner diameter slightly less than the conduit C such that the conduit C fits snuggly in and through the seal 20.

The housing 12 has a second stepped region 32 adjacent to the seal 20, such that the seal 20 is positioned between the first and second stepped regions 30, 32. The seal 20 can be, for example, an O-ring seal formed from a material suitable for the intended application of the fitting. For example, the O-ring can be rubber, neoprene, silicone or the like.

Referring to FIGS. 2, 4 and 7A-7C, in an embodiment, the grip ring support 18 is positioned in the housing 12, adjacent to the seal 20. The grip ring support 18 has a non-circular shape and is configured to cooperate with and fit into the housing internal cavity 24. In the illustrated embodiment, the grip ring support 18 has an octagonal overall shape. However, as discussed above, grip ring support 18 can have a shape complementary to the cavity 24 with for example one or more flattened regions so that the grip ring support 18, when mated with the housing 12 will not rotate relative to the housing 12.

The grip ring support 18 includes a transverse flange 34 (extending transverse to the direction of insertion of the conduit C, as indicated at 50) and a longitudinal wall 36 that extends longitudinally from about a midpoint of the transverse flange 34. In this configuration, the longitudinal wall 36 does not extend fully to an inner peripheral edge or an outer peripheral edge of the transverse flange 34. As such, a first, outer gap 38 is defined between the longitudinal wall 36 and the wall of the housing 12 and second, inner gap 40 is defined between the longitudinal wall 36 and the conduit C. A central opening 42 in the grip ring support 18 has a diameter that is slightly larger than the diameter of the conduit C for which the fitting 10 is sized so that the conduit C easily moves through the grip ring support 18.

Referring to FIGS. 2, 4 and 8A and 8B, in an embodiment, the grip ring 16 is positioned adjacent to the grip ring support 18 and is seated on an end of the longitudinal wall 36. The grip ring 16 also has a non-circular shape and is configured to cooperate with and fit into the housing internal cavity 24 and to cooperate with the grip ring support 18. In this manner, the grip ring support 18 also will not rotate relative to the housing 12.

The grip ring 16 has a peripheral portion 44 (that seats on the longitudinal wall 36) and one or more inwardly oriented gripping members 46. In an embodiment, the gripping members are a series of circumferentially positioned, inwardly projecting angled fingers 46. The ends 48 of the fingers 46 define an internal diameter that, in the resting state, is less than the diameter of the conduit C.

The grip ring fingers 46 are flexible and are angled in the direction of insertion of the conduit 50. As such, when the conduit C is inserted into the fitting 10, the fingers 46 flex forwardly (in the direction of insertion 50) and the conduit C easily passes through the grip ring 16. However, the conduit C is secured in place as the fingers 46 are angled forwardly, and do not flex rearward. As such, the conduit C cannot be removed from the fitting 10. In addition, in that the fingers 46 bear down on the conduit C, the conduit C is also prevented from rotating relative to the grip ring 16. As can be seen from FIG. 2, the grip ring support 18 is positioned between the grip ring 16 and the seal 20. This configuration prevents the grip ring fingers 46 from contacting the seal 20 and thus protects the integrity of the seal 20. This configuration also provides adequate space for the fingers 46 to flex outwardly (into the inner gap 40 between the longitudinal wall 36 and the conduit C) as the conduit C is inserted through the grip ring 16.

As seen in FIGS. 8A and 8B, the fingers 46 can take a wide variety of shapes. For example as seen in FIG. 8A, the fingers 46 can have a rounded end or head 52 with a tapering neck 54 (an omega-like shape) or, as seen in FIG. 8B, the fingers 46' can have a rectangular or square shape 56. A variety other shapes will be appreciated by those skilled in the art and are intended to be within the scope and spirit of the present disclosure. Again, as noted above, and although not shown, the grip ring 16 can have a variety of shapes complementary to the cavity 24, for example, a circular shape with one or more flattened regions so that the grip ring 16, when mated with the housing cavity 24 will not rotate relative to the housing 12.

Referring to FIGS. 2-4 and 6A-6C, the fitting body 14 also has a non-circular shape and is configured to cooperate with and fit, at least in part, in the housing internal cavity 24. The fitting body 14 defines an internal cavity 58 that is also non-circular and, in an embodiment, is octagonal in shape to cooperate with the grip ring 16 and grip ring support 18. As seen in FIGS. 2 and 6, the internal cavity 58 has an outer portion 60 (the largest diameter portion), an intermediate portion 62 and an inner portion 64 (the smallest diameter portion). A first stepped region 66 is defined between the outer portion 60 and the intermediate portion 62 and second stepped region 68 is defined between the intermediate portion 62 and the inner portion 64.

The outer portion 60 is configured and sized to receive the grip ring peripheral portion 44 such that the peripheral portion 44 is secured at the first stepped region 66 between the fitting body 14 and the grip ring support longitudinal wall 36. Because the inner wall of the outer portion 60 and the grip ring peripheral portion 44 have cooperating non-circular shapes, for example, cooperating and mating octagonal shapes, they cannot rotate relative to one another. The intermediate portion 62 and the inner portion 64 can be shaped as well, but they can also be circular in shape (cross-section).

Referring to FIGS. 2 and 5A-5C, in some embodiments, the fitting 10 includes the unlock ring 22 that may be positioned, in part, in the fitting body 14. The unlock ring 22 has a circular body portion 70, a radially outwardly extending ring or flange 72 and an tapered end 74 that tapers forwardly and inwardly from the flange 72. The unlock ring 22 is positioned in the fitting body 14 such that it reciprocates within the fitting body inner portion 64. The flange 72 contacts the second stepped region 68 to maintain the unlock ring 22 in the fitting body 14.

The unlock ring 22 is configured to reciprocate or slide forwardly in the direction 50), toward the grip ring 16 to contact and spread the grip ring fingers 46 to "unlock" the fingers 46 from the conduit C, and to reciprocate or slide rearwardly to disengage from the grip ring fingers 46 so that the grip ring 16 maintains a tight grip on the conduit C. When the unlock ring 22 is slid forwardly, toward the grip ring 16, the fingers 46 are flexed outwardly, into the inner gap 40 between the longitudinal wall 36 and the conduit C (away from the conduit C) so that the conduit C can be pulled or withdrawn from the grip ring 16. In this manner, the conduit C can be installed in and removed from the anti-rotation fitting 10 without damage to the conduit C or the fitting 10. And, it will be appreciated that removing the conduit C from the fitting 10 is readily carried out, also without tools, by sliding the unlock ring 22 forward until the fingers 46 are disengaged from the conduit C, after which the conduit C can be readily pulled from the fitting 10.

Figure 10:
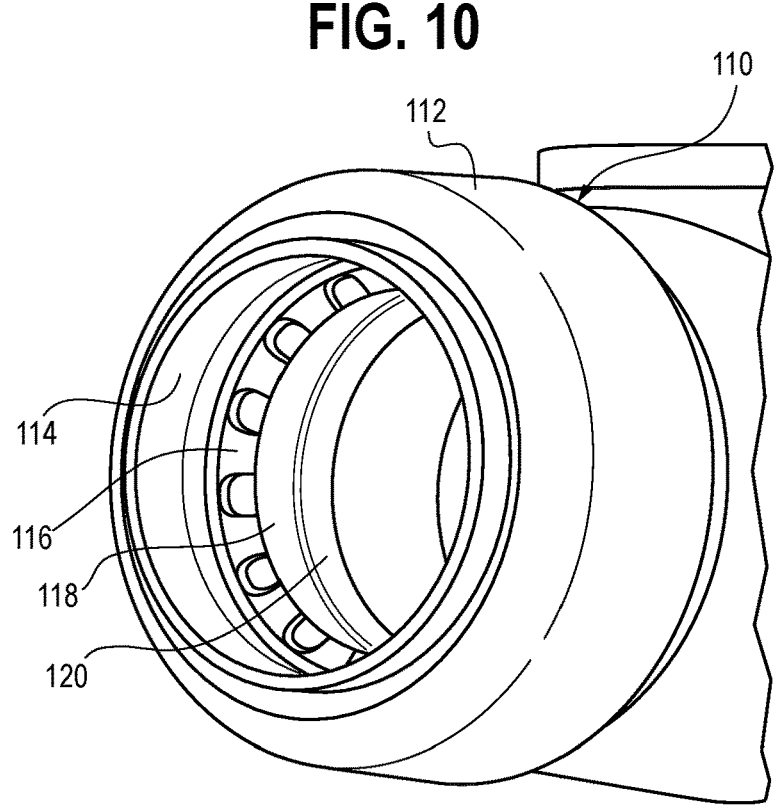
FIG. 10 is a perspective illustration of an embodiment of an anti-rotational push to connect fitting without an unlock ring.

As noted above, and as illustrated in FIG. 10, in some embodiments, the fitting 110 can be made without the unlock ring. In such an embodiment of the fitting 110, the conduit (not shown) can be inserted or installed in the fitting 110, but cannot be removed. In such an embodiment, all of the other components, such as the housing 112, fitting body 114, grip ring 116, grip ring support 118 and seal 120 are present, and the grip ring 116 retains the conduit in place in the fitting 110 and prevents rotation of the conduit relative to the fitting 110.

It will also be understood that because the grip ring 16, grip ring support 18 and fitting body internal cavity outer portion 60 are all non-circular in shape and fit within and cooperate with one another, these components (e.g., the grip ring 16, grip ring support 18 and fitting body 14) do not rotate relative to one another, and prevent the conduit C from rotating relative to the fitting 10.

The fitting components can be formed from a wide variety of materials. For example, the fitting body 14, grip ring support 18, and unlock ring 22 can be formed from a suitable polymer, brass, stainless steel, copper and the like. The grip ring 16 can be formed from, for example, stainless steel or any resilient (spring-like) material that permits the fingers 46 to flex forwardly to release the conduit C and to spring back onto the conduit C to maintain the fingers 46 bearing down on the conduit C.

As seen in FIGS. 1, 2 and 9, the housing 12 encloses most of the components of the fitting 10. For example, the fitting body 14, (with a portion of the unlock ring 22), the grip ring 16, grip ring support 18 and seal 20, can all be enclosed within the housing 12. An end 76 of the housing 12 can be rolled or otherwise closed onto the fitting body 14 to retain the fitting 10 components in place. The housing 12, like the fitting body 14 can be formed from a wide variety of materials suitable for the application in which the fitting 10 is used.

In embodiments, various components of the fitting 10 can be molded and/or over-molded to form portions of the fitting 10. For example, the grip ring support 18 can be inserted or molded into the housing, and the fitting body 14 over molded over the grip ring 16 and the support 18. Other portions of the fitting 10 and molding or over-molding various components within the housing 12 will be recognized by those skilled in the art and are within the scope and spirit of the present disclosure.

It is to be understood that the various features from any of the embodiments above are usable together with the other embodiments described herein. Further, it is understood that same or similar terminology used across the different embodiments above refers to the same or similar component, with the exception of any differences described or shown in the figures.

It will also be appreciated by those skilled in the art that the relative directional terms such as upper, lower, rearward, forward and the like are for explanatory purposes only and are not intended to limit the scope of the disclosure. All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. An anti-rotational push to connect fitting comprising:
a housing defining an internal cavity, the internal cavity having, at least in part, a non-circular shape, the housing having a conduit receiving region having an inwardly oriented wall;
a seal positioned in the housing adjacent to the conduit receiving region;
a grip ring positioned in the housing, the grip ring having a non-circular shape configured to cooperate with and fit into the housing internal cavity, the grip ring having a peripheral portion and a series of circumferentially positioned, inwardly projecting flexible, angled fingers or gripping members; and
a grip ring support positioned in the housing adjacent to the seal,
wherein the grip ring support has a transverse flange having an inner peripheral edge and an outer peripheral edge and a longitudinal wall extending from the transverse flange spaced from the inner peripheral edge and the outer peripheral edge to define a first gap between the longitudinal wall and a wall of the housing and second gap inwardly of the longitudinal wall, and wherein the grip ring is positioned adjacent to the grip ring support and seated on an end of the longitudinal wall.

2. The anti-rotational push to connect fitting of claim 1, wherein the grip ring support has a non-circular shape configured to cooperate with and fit into the housing internal cavity.

3. The anti-rotational push to connect fitting of claim 1, further including a fitting body configured to cooperate with and fit, at least in part, in the housing internal cavity, the fitting body defining an internal cavity having a non-circular shape configured to cooperate with the grip ring and the grip ring support, the fitting body internal cavity configured to receive the grip ring peripheral portion to secure the grip ring peripheral portion.

4. The anti-rotational push to connect fitting of claim 3, wherein the fitting body has a non-circular shape configured to cooperate with and fit, at least in part, in the housing internal cavity.

5. The anti-rotational push to connect fitting of claim 3, further including an unlock ring positioned, in part, in the fitting body, the unlock ring having a body, a flange, and a tapered end tapering forwardly and inwardly from the flange, the unlock ring configured to reciprocate within the fitting body between a grip ring locked position and a grip ring unlocked position.

6. The anti-rotational push to connect fitting of claim 5, wherein when in the grip ring unlocked position, the tapered end contacts and urges the grip ring flexible fingers outwardly.

7. The anti-rotational push to connect fitting of claim 5, wherein the housing defines a longitudinal axis, and wherein the housing, the grip ring support, the grip ring, the fitting body and the unlock ring are all coaxial.

8. The anti-rotational push to connect fitting of claim 3, wherein the fitting body is positioned to overlie the grip ring support longitudinal wall and to capture the grip ring peripheral portion between the fitting body and the grip ring support longitudinal wall.

9. The anti-rotational push to connect fitting of claim 3, wherein the grip ring support has a non-circular shape configured to cooperate with and fit into the housing internal cavity, and wherein the non-circular shape of the housing internal cavity, the grip ring, the grip ring support and the fitting body are a polygonal shape.

10. The anti-rotational push to connect fitting of claim 9, wherein the polygonal shape of the housing internal cavity, the grip ring, the grip ring support and the fitting body are a hexagonal shape.

11. The anti-rotational push to connect fitting of claim 3, wherein the fitting body is over-molded over the grip ring in the housing.

12. The anti-rotational push to connect fitting of claim 11 wherein the fitting body is over-molded over the grip ring support.

13. The anti-rotational push to connect fitting of claim 1, wherein the housing internal cavity includes a first stepped region and a second stepped region, and wherein the seal is positioned in the first stepped region.

14. The anti-rotational push to connect fitting of claim 1, wherein the grip ring is molded into the housing.

15. The anti-rotational push to connect fitting of claim 1, wherein the grip ring is formed from metal.

16. The anti-rotational push to connect fitting of claim 15 wherein the metal is stainless steel.

* * * * *